United States Patent [19]
Hansen

[11] 3,989,118
[45] Nov. 2, 1976

[54] BATTERY SUPPORT WITH ROLL OUT FRAME

[75] Inventor: Howard A. Hansen, Mossville, Ill.

[73] Assignee: Caterpillar Tractor Co., Peoria, Ill.

[22] Filed: Oct. 16, 1975

[21] Appl. No.: 623,196

[52] U.S. Cl. .............................................. 180/68.5
[51] Int. Cl.² ........................................ B60R 18/02
[58] Field of Search ...................... 180/68.5; 104/34; 105/51; 312/341 R, 333, 348; 136/171, 166

[56] References Cited
UNITED STATES PATENTS

| | | | |
|---|---|---|---|
| 1,081,706 | 12/1913 | Thompson | 180/68.5 |
| 1,165,784 | 12/1915 | Klingelsmith | 180/68.5 |
| 1,209,962 | 12/1916 | Heath | 180/68.5 |
| 1,413,686 | 4/1922 | Schellentrager et al. | 105/51 |
| 1,678,033 | 7/1928 | Brumbaugh | 180/68.5 |
| 3,003,573 | 10/1961 | Lorenz | 180/68.5 |
| 3,708,028 | 1/1973 | Hafer | 180/68.5 |
| 3,847,242 | 11/1974 | Kappel | 180/68.5 |
| 3,926,491 | 12/1975 | Greer | 312/341 R |

FOREIGN PATENTS OR APPLICATIONS 738,985  10/1955  United Kingdom ................ 180/68.5

Primary Examiner—M. H. Wood, Jr.
Assistant Examiner—David M. Mitchell
Attorney, Agent, or Firm—Wegner, Stellman, McCord, Wiles & Wood

[57] ABSTRACT

A battery support for use in a vehicle permitting the battery to be selectively disposed in an installed position and a service position. The support includes a carrier having wheels engaging a track carried by a base portion of the support for facilitating movement of the carrier and battery between the installed and service positions. Stops are provided for limitin the movement of the carrier to the preselected desired positions and structure is provided for stabilizing the carrier and battery in the installed position to prevent rattling and moving of the battery therein. The structure is arranged to accommodate extension of the battery cables about the rear of the battery so as to permit facilitated selective movement of the battery to and from the service position.

9 Claims, 4 Drawing Figures

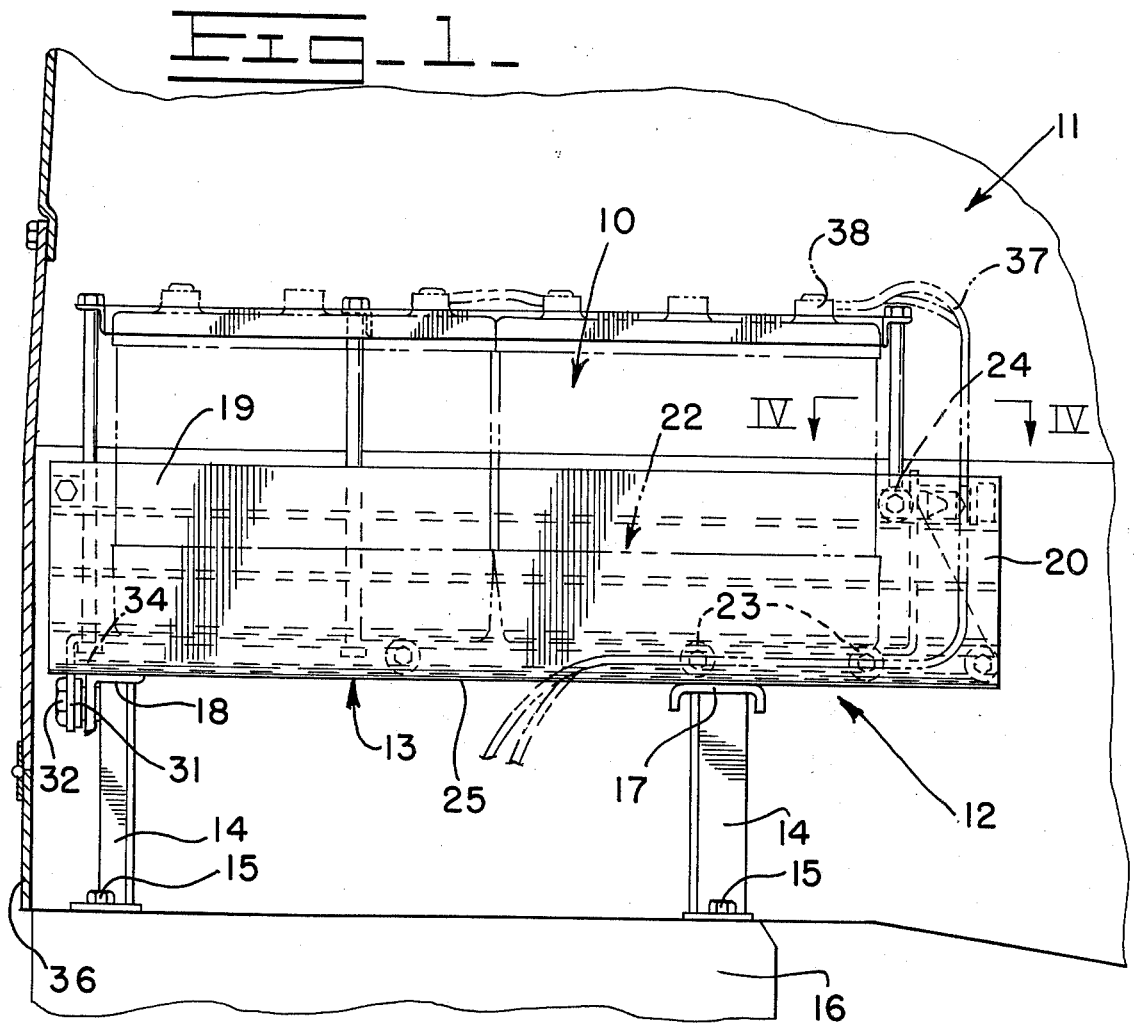
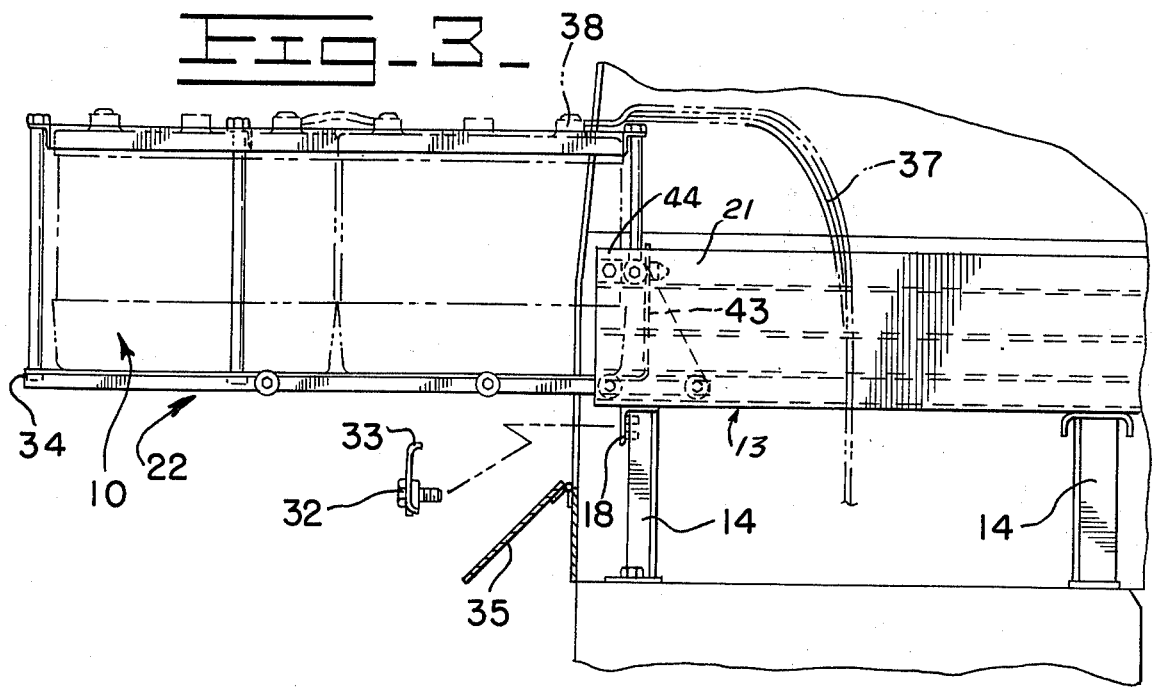

BATTERY SUPPORT WITH ROLL OUT FRAME

BACKGROUND OF THE INVENTION

1. Field of the Invention

This invention relates to vehicle structures and in particular to means for mounting of batteries in vehicles.

2. Description of the Prior Art

In the conventional battery installation in vehicles, such as automobiles and trucks, the electrical system storage battery is installed in a carrier fixedly mounted on a portion of the vehicle structure requiring the lifting of the battery upwardly from the carrier as for servicing or replacement theroef. Quite often, the location of the carrier makes it awkward to effect such lifting.

To facilitate such serving, one form of battery installation means has been developed for use in vans defining a battery tray which may be slid out from the van by means of a small pallet truck. The device may have built-in rollers to facilitate the tray removal, permitting the battery to be recharged or serviced, as desired, on the tray at a position remote from the van or truck.

SUMMARY OF THE INVENTION

The present invention comprehends an improved means for mounting a battery in a vehicle for facilitated maintenance thereof. More specifically, the battery mounting means of the present invention includes a base defining a front portion, a rear portion and side portions, track means on the side portions extending between the front and rear portions, a carrier for removably supporting the battery, wheel means on the carrier riding on the track means for guiding the carrier between an installed position overlying the base and a service position forwardly of the base, and means for releasably locking the carrier in the installed position.

The locking means may comprise wall means secured to the base front portion to project to forwardly of the carrier. Stabilizer means may be provided at the rear of the base for stabilizing the carrier against lateral displacement in the installed disposition whereby the carrier and battery are securely locked against rattling and movement in the use of the vehicle.

The base rear portion may define a space rearwardly of the battery to accommodate extension of the battery cables therethrough whereby the cables may be extended forwardly behind the battery in the movement of the battery to the forward service position. Thus, the cable terminals may be brought to a readily accessible position for disconnection and connection thereof in the servicing operation.

The stabiizer means may comprise pin and socket means brought into automatic cooperative association as an incident of the movement of the carrier to the installed position.

Thus, the battery mounting means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary side elevation of a vehicle battery mounting means embodying the invention;

FIG. 3 is a side elevation illustrating the arrangment of the mounting means in a forward service position.

DESCRIPTION OF THE PREFERRED EMBODIMENT

Figure 2:
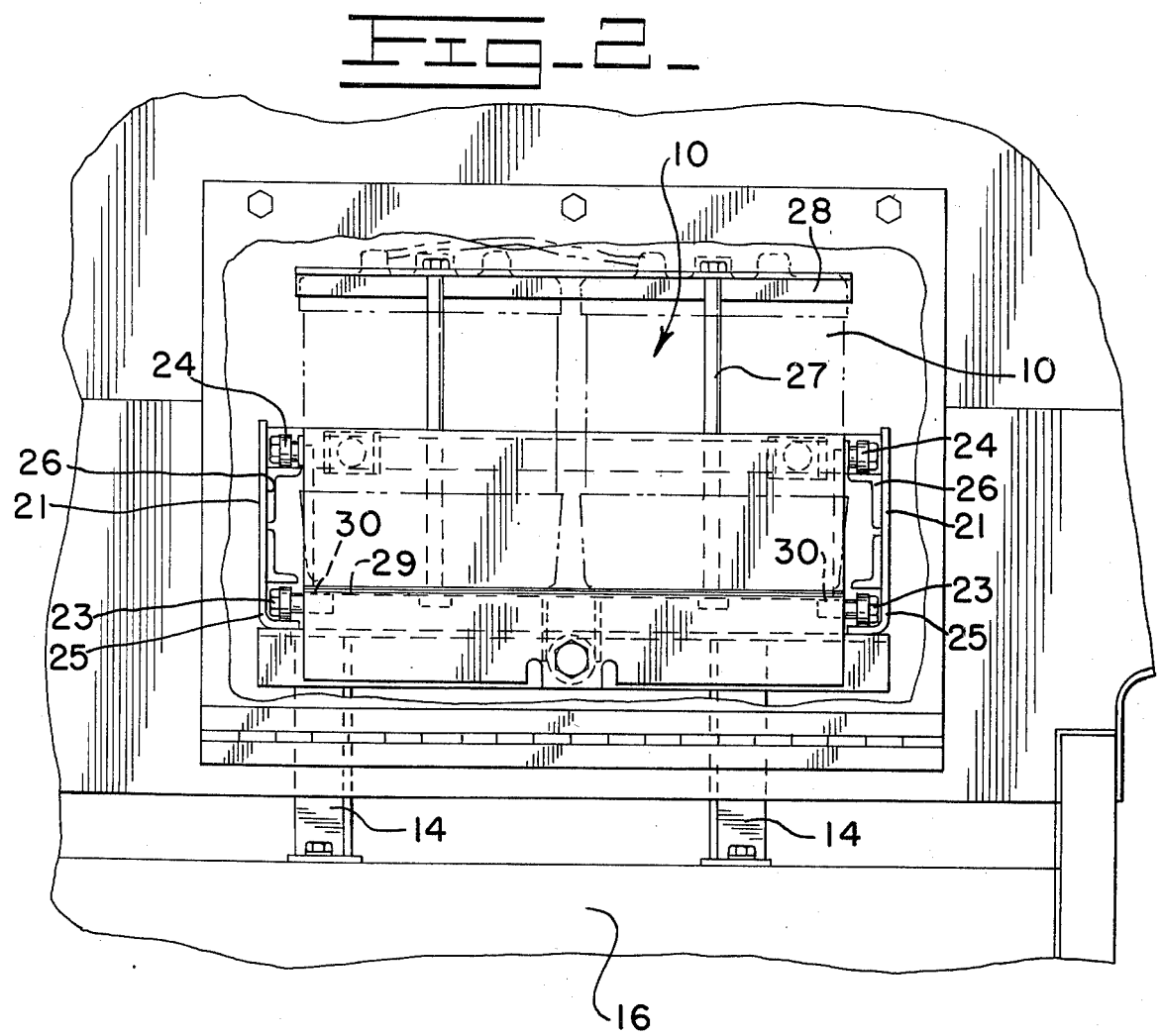
FIG. 2 is a fragmentary front elevation thereof with a portion broken away to facilitate illustration of the mounting means structure.

In the exemplary embodiment of the invention as disclosed in the drawing, a storage battery generally designated 10 is mounted in a vehicle generally designated 11 by means of an improved mounting structure generally designated 12 permitting the battery to be readily selectively disposed in an installed position, as shown in FIG. 1, and a service position, as shown in FIG. 3.

Mounting structure 12 includes a base 13 carried on suitable legs 14 secured as by bolts 15 to a portion of the vehicle, such as drive case 16. The base may be secured to the legs 14 as by welding to a channel 17 and angle iron 18.

Base 13 defines a U-shaped structure having a front portion 19, a rear portion 20, and side portions 21. Battery 10 is supported on a carrier 22 provided with a plurality of wheels 23 extending at spaced intervals along the lower edge of each of the side portions 21, and a pair of wheels 24 on the upper edge portion of the side portions at rear portion 20 of the carrier. Wheels 23 ride in channel tracks 25 at opposite sides of the base, and wheels 24 ride on angle iron tracks 26 at opposite sides of the base spaced above tracks 25, as best seen in FIG. 2. Further, as best seen in FIG. 2, tie-down rods 27 may be provided for locking a top frame 28 about the top portion of battery 10 to secure the battery on the bottom wall 29 of the carrier. The wheels 23 may be carried on suitable mounting posts 30 secured to the underside of bottom wall 29, as shown in FIG. 2.

The carrier is releasably locked in the installed position of FIG. 1 by a locking wall member 31 provided with a captured bolt 32 removably threaded to the angle iron 18, as shown in FIG. 1. An inturned stop portion 33 on wall member 31 engages the front end of the carrier to effect the locking operation.

To permit movement of the carrier to the service position of FIG. 3, the user merely unthread bolt 32 from angle 18, as shown in FIG. 3, after swinging an access door 35 of a surrounding enclosure 36 to an open position to provide access to the bolt 32 and carrier 22, as shown in FIG. 3.

As further illustrated in FIGS. 1 and 3, the rear portion 20 of base 13 extends rearwardly of the carrier 22 in the installed arrangement of the apparatus whereby the battery cables 37 may extend down from the terminals 38 through the space 44 (FIG. 4) and under carrier 22 for connection to the vehicle electrical system (not shown). Thus, when the carrier is brought forwardly to the service position of FIG. 3, the cables merely move forwardly with the rear portion of the battery for facilitated servicing. As shown in FIG. 3, means are provided for limiting forward movement of the carrier to the service position, more specifically including a stop 44 carried on the forward end of base side portion 21.

Figure 4:
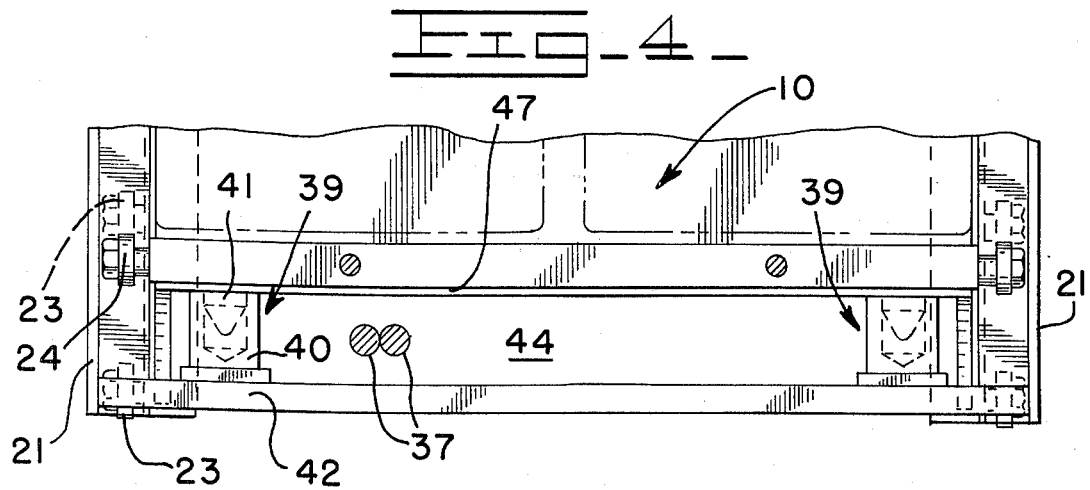
FIG. 4 is a fragmentary horizontal section taken substantially along the line IV—IV of FIG. 1.

The invention further comprehends an improved means for stabilizing the carrier in the installed position, as shown in FIG. 4. More specifically, the stabilizing means generally designated 39 includes a socket 40 on the base and a pin 41 on the carrier. As shown, the socket may be mounted to a cross bar 42 extending between the side walls 21 of the base and the pin 41 may be mounted to an upstanding wall 43 extending transversely across the rear of the carrier. The stabilizing means 39 prevents lateral displacement of the carrier relative to the base and, thus, locks the carrier and battery carried thereon against rattling and undesirable movement during operation of the vehicle. Further, the stabilizing means serves as a rear stop limiting the rearward movement of the carrier to the desired installed position illustrated in FIG. 1.

As indicated briefly above, the battery mounting means of the present invention provides facilitated servicing of the battery means while yet assuring positive locked installation of the battery in the vehicle in normal use. The use of the vertically spaced tracks and wheel means on the carrier for cooperation therewith permits the battery to be readily moved between the installed and service positions with minimum effort. The apparatus is arranged to positively lock the battery in the installed position against undesirable movement while yet providing the desirable facilitated servicing.

The foregoing disclosure of specific embodiments is illustrative of the broad inventive concepts comprehended by the invention.

I claim:

1. In a vehicle having an electrical system including a battery provided with an upper terminal, improved means for mounting the battery in the vehicle for facilitated maintenance comprising: a base defining a bottom opening a front portion, a rear portion and side portions; a carrier for removably supporting the battery spaced above said bottom opening of the base, said carrier having a rear portion spaced forwardly of said base rear portion to define a rear space in an installed position; means on said carrier and base for guiding the carrier between said installed position overlying the base and a service position forwardly of the base; means for releasably locking the carrier in the installed position; and a flexible battery cable having one end connected to said battery terminal, and a midportion extending downwardly behind said battery through said rear space, forwardly therefrom under said and downwardly through said bottom opening in said installed position, said cable midportion extending substantially directly downwardly behind said battery and between said side portions of the base and downwardly through said bottom opening in said service position.

2. The vehicle structure of claim 1 wherein said locking means comprises wall means secured to said base front portion and projecting to forwardly of said carrier.

3. The vehicle structure of claim 1 wherein stop means are provided on said base for limiting forward movement of the carrier to said service position.

4. The vehicle structure of claim 1 wherein stop means are provided on said base for limiting rearward movement of the carrier to said installed position.

5. The vehicle structure of claim 1 further including stabilizer means for supporting the carrier at said base rear portion against lateral displacement in the installed position.

6. The vehcile structure of claim 5 wherein said stabilizer means comprises cooperating pin and socket means on said base and carrier.

7. The vehicle structure of claim 5 wherein said stabilizer means comprises separable means automatically disengaged as an incident of movement of the carrier forwardly from said installed position.

8. The vehicle structure of claim 5 wherein said stabilizer means includes forwardly opening socket means on said base and rearwardly projecting pin means on said carrier arranged to be received in said socket means when the carrier is in said installed position.

9. The vehicle structure of claim 5 further including means at said front portion of the base for releasably locking the carrier against forward movement from said installed position, said stabilizer means further defining means for locking said carrier against rearward movement from said installed position.

* * * * *

UNITED STATES PATENT AND TRADEMARK OFFICE
CERTIFICATE OF CORRECTION

PATENT NO. : 3,989,118
DATED : November 2, 1976
INVENTOR(S) : Howard A. Hansen

It is certified that error appears in the above-identified patent and that said Letters Patent are hereby corrected as shown below:

In the Abstract of the Disclosure, line 7, correct "limitin" to --limiting--;

Column 1, line 54, correct "stabiizer" to --stabilizer--;

Column 2, line 4, correct "arrangment" to --arrangement--;

Column 2, line 49, after "user" insert --need--;

Column 3, line 34 (Claim 1), after "opening" insert a comma (--,--); and

Column 4, line 24 (Claim 6), correct "vehcile" to --vehicle--

Signed and Sealed this

Eighteenth Day of April 1978

[SEAL]

Attest:

RUTH C. MASON
Attesting Officer

LUTRELLE F. PARKER
Acting Commissioner of Patents and Trademarks